(12) United States Patent
Royer

(10) Patent No.: US 7,513,561 B2
(45) Date of Patent: Apr. 7, 2009

(54) DEVICE FOR MANIPULATING A TARPAULIN

(76) Inventor: Réal Royer, 5735, rue Barré, Saint-Hyacinthe (CN) J2R 1E4

( * ) Notice: Subject to any disclaimer, the term of this patent is extended or adjusted under 35 U.S.C. 154(b) by 0 days.

(21) Appl. No.: 11/714,796

(22) Filed: Mar. 7, 2007

(65) Prior Publication Data

US 2008/0217952 A1 Sep. 11, 2008

(51) Int. Cl.
*B60P 7/02* (2006.01)
(52) U.S. Cl. .................... 296/98; 296/100.01
(58) Field of Classification Search .............. 296/98, 296/100.01, 101, 100.11, 100.12, 100.13, 296/100.16
See application file for complete search history.

(56) References Cited

U.S. PATENT DOCUMENTS

| | | | | | |
|---|---|---|---|---|---|
| 4,212,492 | A | * | 7/1980 | Johnsen | 296/98 |
| 4,302,043 | A | * | 11/1981 | Dimmer et al. | 296/98 |
| 4,484,777 | A | * | 11/1984 | Michel | 296/98 |
| 5,466,030 | A | * | 11/1995 | Harris et al. | 296/98 |
| 5,765,901 | A | * | 6/1998 | Wilkens | 296/98 |
| 5,823,067 | A | | 10/1998 | Clarys et al. | |
| 6,478,361 | B1 | * | 11/2002 | Wood | 296/98 |
| 6,513,856 | B1 | * | 2/2003 | Swanson et al. | 296/98 |

FOREIGN PATENT DOCUMENTS

CN 2004698 5/1992

* cited by examiner

*Primary Examiner*—Hilary Gutman

(57) ABSTRACT

A device for manipulating a tarpaulin so as to selectively cover and uncover a top aperture of a container the device being usable in combination with an actuator providing a rotational motion, the device comprising: a rod for rolling the tarpaulin therearound and for unrolling the tarpaulin therefrom; a rod rotating component having a substantially elongated configuration, the rod rotating component defining a component longitudinal axis, the rod rotating component being linkable to the actuator so as to be rotatable therewith about the rod longitudinal axis, the rod rotating component being operatively coupled to the rod in a manner such that rotating the rod rotating component about the component longitudinal axis rotates the rod about the rod longitudinal axis, the rod rotating component being pivotable relatively to the actuator and configurable between a component shortest configuration and a component longest configuration.

16 Claims, 4 Drawing Sheets

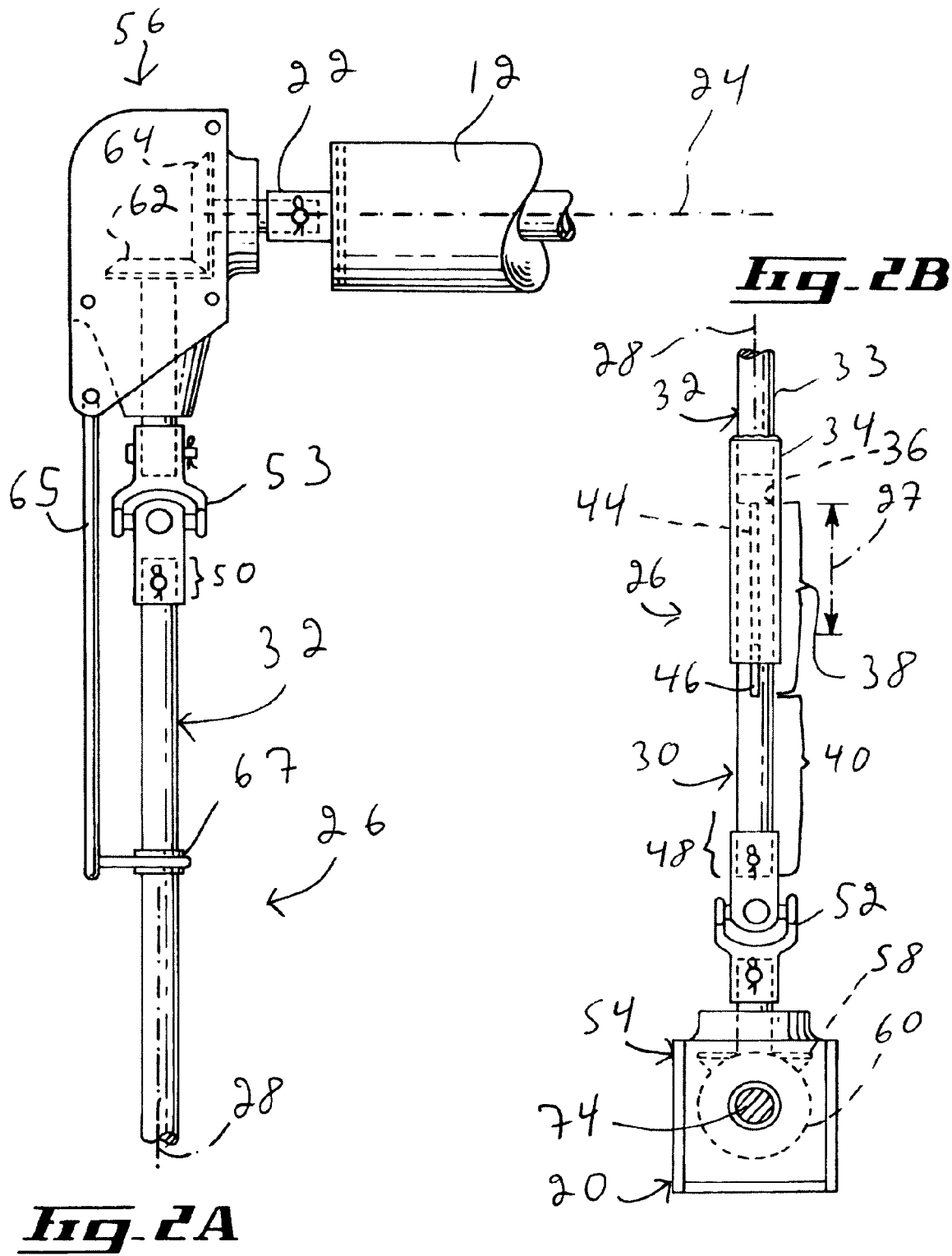

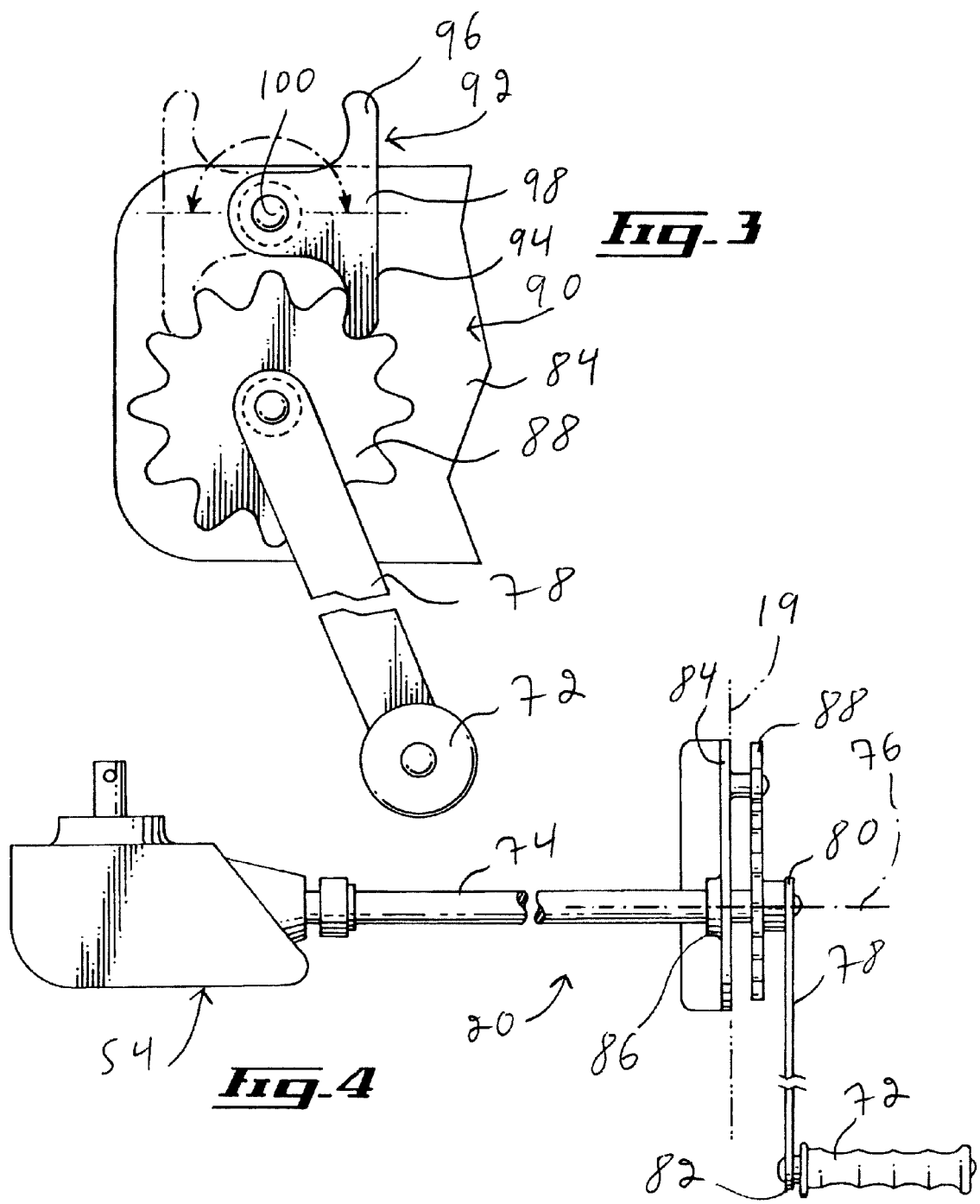

DEVICE FOR MANIPULATING A TARPAULIN

FIELD OF THE INVENTION

The present invention relates generally to tarpaulins. More specifically, the present invention is concerned with a device for manipulating a tarpaulin.

BACKGROUND OF THE INVENTION

Vehicle cargo containers for transporting bulk material such as sawdust, gravel chip, cutter shavings and the like typically include open top boxes such as semi-trailers or the like defining side walls, a front wall, a rear wall and a floor. These open top containers are typically mechanically coupled to various types of vehicles such as cargo ships, railway carts and truck cabins for transporting goods between various locations.

During transportation in these so-called open top containers, there exists a substantial risk that a portion of the load may be blown out of the open top container by various physical phenomena such as vibration, aerodynamically created vacuum, wind or the like. If some of the load is accidentally blown out of the container it may potentially not only cause unnecessary wastage of the transported goods but may also create a dangerous situation.

For example, when the open-top container is attached to a truck cabin, some of the load accidentally blown out of the container may contaminate the road or highway as it whirls around thus causing dangerous ground road conditions. It may also be blown directly towards the windshield of following vehicles creating a potentially disastrous situation.

Accordingly, in many areas, regulations have been implemented for the carriage of various loads, particularly on public highways requiring that open top containers be provided with some type of covering structure for covering the loading aperture during transport. With the increasing number of accidents, these official requirements have become more and more stringent, sometimes requiring adequate coverage for the load on even short journeys.

Consequently, there has been an industry wide move to provide permanently installed flexible covers often referred to as tarpaulins or tarps that can be quickly rolled and unrolled by the driver so as to respectively allow selective uncovering and covering of the load. When these permanently installed tarpaulins are used only occasionally they may be stored on the vehicle in a folded condition and unfolded over the body as and when required.

Various configurations of tarpaulins have been proposed. However, two configurations have proven to be particularly popular. One such configuration is the so called end-rolled tarpaulin which is gathered at one of the longitudinal ends of the container when not in use and moved along the body of the container between operative and stored positions.

The end-rolled tarpaulins are typically gathered at the front end of the vehicle and are usually provided along their length with a number of transverse supporting bars which extend between the two longer side walls of the container. The end-rolled tarpaulins are typically moved by means of a pair of cables trained over pulleys and carrying the tarpaulins with them as they move. With such an arrangement, the movement of the tarpaulin typically moves the bows automatically out of the way so that the latter do not obstruct the re-loading through the top opening. The movement of the bows out of the way also reduces the risks of having the latter damaged by a new load.

The other type of permanently installed tarpaulins preferred by some haulers is commonly referred to as a side-rolled tarpaulin. The side-load tarpaulins typically, permanently extend the full length of the container body and are rolled and unrolled about a so-called rolling rod that also typically extends the full length of the container body.

Many devices exist for retracting an extending these tarpaulins. However, these devices are typically relatively complex. In addition, they often require that an intended user of the device climb onto the container onto which the tarpaulin retracting and extending device is positioned. This causes risks of injury to the intended user of these devices as the intended user may then fall from the container. In addition, these devices often require that the intended user perform movements in non-ergonomic positions, which may also lead to injuries.

Against this background, there exists a need in the industry to provide a novel device for manipulating a tarpaulin.

An object of the present invention is therefore to provide a device for manipulating a tarpaulin.

SUMMARY OF THE INVENTION

In a first broad aspect, the invention provides a device for manipulating a tarpaulin so as to selectively cover and uncover a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture, the device being usable in combination with an actuator providing a rotational motion, the actuator being spaced apart from the top aperture, the device comprising:

a rod for rolling the tarpaulin therearound when configuring the tarpaulin from the extended configuration to the retracted configuration and for unrolling the tarpaulin therefrom when configuring the tarpaulin from the retracted configuration to the extended configuration, the rod defining a rod longitudinal axis;

a rod rotating component having a substantially elongated configuration, the rod rotating component defining a component longitudinal axis, the rod rotating component being linkable to the actuator so as to be rotatable therewith about the component longitudinal axis, the rod rotating component being operatively coupled to the rod in a manner such that rotating the rod rotating component about the component longitudinal axis rotates the rod about the rod longitudinal axis;

wherein the rod rotating component is
  pivotable relatively to the actuator so as to be movable between a component open position and a component closed position, wherein in the component open position, the tarpaulin is in the tarpaulin open configuration and in the component closed position, the tarpaulin is in the tarpaulin closed configuration; and
  configurable between a component shortest configuration and a component longest configuration, the rod rotating component being longer in the component longest configuration than in the component shortest configuration;

whereby upon the actuator providing the rotational motion, the rod rotating component is rotated about the component longitudinal axis, which in turn rotates the rod about the rod longitudinal axis and pivots the rod rotating component between the component open and closed positions, variations in a length of the rod rotating component allowing the rod to remain linked to the actuator while remaining substantially adjacent to the top aperture as the rod is moved across the top aperture.

Advantageously, the proposed device is relatively simple to operate using a series of relatively simple, quick and ergonomic steps.

In some embodiments of the invention, the device includes also the actuator. Also, in some embodiments of the invention, the actuator is operable using an actuating portion that is located substantially adjacent the side of the container and substantially adjacent a bottom wall of the container. In these embodiments, the device may therefore be operated by an intended user with the intended user keeping both feet on the ground. This significantly reduces the risks that the intended user will become injured either by falling from the container or by exerting a force unto a component in a non-ergonomic posture. For example, the actuating portion includes a handle provided for rotating an axle operatively coupled to the rod rotating component to rotate the rod rotating component about the component longitudinal axis. In another example, the actuating portion includes a controller operatively coupled to a motor, the motor being coupled to the rod rotating component to rotate the rod rotating component about the component longitudinal axis.

The proposed device is relatively easily manufactured using known techniques and materials. In addition, the proposed device is relatively economical to produce and, in some embodiments of the invention, is retrofittable to existing containers.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 2A, in a side elevation view with parts removed, illustrates the attachment of a rod rotating component of the device shown in FIG. 1 to a rod for rolling the tarpaulin therearound, also shown in FIG. 1;

FIG. 2B, in a side elevation view with parts removed, illustrates the coupling of a first and a second member of the rod rotating component shown in FIGS. 1 and 2A;

FIG. 3, in a side elevation view, illustrates a lock usable to selectively allow a rotation of the rod rotating component shown in FIGS. 1, 2A and 2B in a single direction;

FIG. 4, in a front elevation view, illustrates an actuator usable to actuate the device shown in FIG. 1;

DETAILED DESCRIPTION

Figure 1:
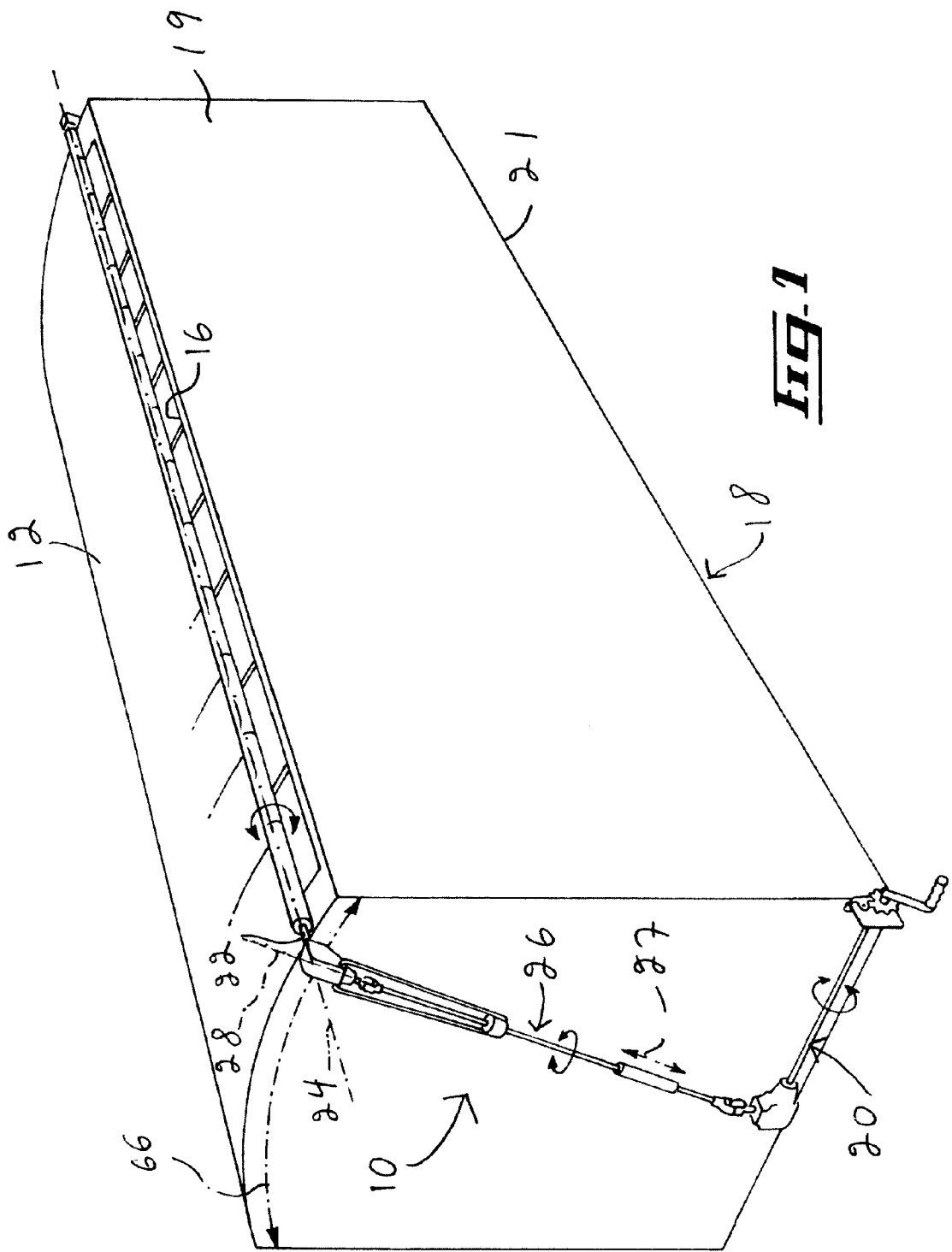
FIG. 1, in a perspective view, illustrates a device for manipulating a tarpaulin in accordance with an embodiment of the invention, the device being shown attached to a container and manipulating the tarpaulin.

FIG. 1 illustrates a device 10 for manipulating a tarpaulin 12 in accordance with an embodiment of the present invention. The device 10 is provided to selectively cover and uncover a top aperture 16 of a container 18. The container 18 includes a peripheral wall 19 and a bottom wall 21, the top aperture 16 being defined by the peripheral wall 19 and located substantially opposed to the bottom wall 21. However, in alternative embodiments of the invention, the container 18 is any other suitable container.

The reader skilled in the art will readily appreciate that directional designations such as up, down, front, rear and side used in the present document are used only for clarity purposes and that the device 10 may be used with containers having any orientation.

The tarpaulin 12 is configurable between an extended configuration and a retracted configuration. In the extended configuration, the tarpaulin 12 substantially covers the top aperture 16. In FIG. 1, the tarpaulin 12 is almost in the extended configuration. In the retracted configuration, the tarpaulin is substantially retracted from the top aperture 16.

The device 10 is usable in combination with an actuator 20 providing a rotational motion. The actuator 20 is spaced apart from the top aperture 16.

The device 10 includes a rod 22 for rolling the tarpaulin 12 therearound when configuring the tarpaulin 12 from the extended configuration to the retracted configuration and for unrolling the tarpaulin 12 therefrom when configuring the tarpaulin 12 from the retracted configuration to the extended configuration. The rod 22 defines a rod longitudinal axis 24.

The device 10 also includes a rod rotating component 26 having a substantially elongated configuration. The rod rotating component 26 defines a component longitudinal axis 28. The rod rotating component 26 is linkable to the actuator 20 so as to be rotatable therewith about the component longitudinal axis 28. The rod rotating component 26 is operatively coupled to the rod 22 in a manner such that rotating the rod rotating component 26 about the component longitudinal axis 28 rotates the rod 22 about the rod longitudinal axis 24.

The rod rotating component 26 is pivotable relatively to the actuator 20 so as to be movable between a component opened position and a component closed position. In the component opened position, the tarpaulin 12 is in the tarpaulin opened configuration and in the component closed position, the tarpaulin 12 is in the tarpaulin closed configuration.

The rod rotating component 26 is configurable between a component shortest configuration and a component longest configuration, as indicate by the arrow 27. The rod rotating component 26 is longer in the component longest configuration than in the component shortest configuration.

Upon the actuator 20 providing the rotational motion, the rod rotating component 26 is rotated about the component longitudinal axis 28 which, in turn, rotates the rod 22 about the rod longitudinal axis 24 and pivots the rod rotating component 26 between the component opened and closed positions. Variations in the length of the rod rotating component 26 allow the rod 22 to remain linked to the actuator 20 while remaining substantially adjacent to the top aperture 16 as the rod 22 is moved across the top aperture 16.

This configuration provides an actuator 20 that is spaced apart from the rod 22 and, therefore, that may be located substantially adjacent the bottom wall 21 of the container 18. In turn, this allows an intended user to operate the device 10 while remaining on the ground or on a relatively low height object. In addition, this allows the intended user to be positioned so as to ergonomically operate the device 10. This configuration therefore reduces the risks of injuries that may occur if the intended user operated the device in a nonergonomic position or if the intended user fell from the container 18.

Referring to FIG. 2B, in some embodiments of the invention, the rod rotating component 26 includes a first and a second member 30 and 32. The first member 30 is substantially elongated and extends along the component longitudinal axis 28. The first member 30 is mechanically coupled to the actuator 20 (only partially shown in FIG. 2B) so as to be rotatable therewith. The second member 32 is substantially elongated and extends substantially longitudinally from the first member 30. As seen in FIG. 2A, the second member 32 is operatively coupled to the rod 22 in a manner such that rotating the second member 32 about the component longitudinal axis 28 rotates the rod 22 about the rod longitudinal axis 24.

The first and second members 30 and 32 are operatively coupled to each other so as to be substantially jointly rotatable about the component longitudinal axis 28 and so as to be substantially longitudinally movable relatively to each other to allow configuration of the rod rotating component 26 between the component shortest and longest configurations.

As better shown in FIG. 2B, to that effect, the second member 32 defines a sleeve 34 extending substantially longitudinally substantially adjacent to the first member 30. The sleeve 34 defines a bore 36 extending substantially longitudinally. Also, the first member 30 defines a sleeve receiving section 38 slidably mounted within the bore 36. The sleeve 34 and the sleeve receiving section 38 are configured and sized so as to allow a longitudinal sliding movement of the sleeve 34 and the sleeve receiving section 38 relatively to each other and a joint rotation about the component longitudinal axis 28 of the first and second members 30 and 32.

The sleeve 34 is linked to a second member rod 33 that extends substantially longitudinally away from the first member 30 towards the rod 22. Similarly, the sleeve receiving section 38 is coupled to a first member rod 40 extending substantially longitudinally towards the actuator 20. In some embodiments of the invention, the first member rod 40 extends integrally and unitarily as a single piece of material from the sleeve receiving portion 45.

In some embodiments of the invention, the joint rotation of the first and second members 30 and 32 is provided for by a substantially longitudinal groove 44 defined by the bore 36 and a tongue 46, configured and sized so as to be longitudinally slidably received within the substantially longitudinal groove 44, the tongue 46 being defined by the sleeve receiving section 38.

This specific configuration of the first and second members 30 and 32 is relatively easily manufactured and relatively easily assembled unto the containers 18. In addition, in some embodiments of the invention, the first and second members 30 and 32 may be easily disengaged from each other, which allows for relatively easy assembly of the device 10 to containers 18 having different sizes, as there is only a need to change, for example, the first member 30 to ensure that the total length of the rod rotating component 26 matches the size of the container 18.

Referring respectively to FIGS. 2B and 2A, the rod rotating component 26 defines a component first end section 48 and a substantially longitudinally opposed component second end section 50. The component first end section 48 is pivotally secured to the actuator 20. In the embodiment of the invention shown in the drawings, the component first end section 48 is defined by the first member 30. For example, the device 10 includes a cardan joint 52, the cardan joint 52 being attachable to the actuator 20 and attached to the component first end section 48 to allow the rod rotating component 26 to pivot relatively to the actuator 20 while transmitting the rotational motion provided by the actuator 20 to the rod rotating component 26 so as to pivot the rod rotating component 26 about the component longitudinal axis 28.

This configuration of the link between the rod rotating component 26 and the actuator 20 provides a relatively easily manufactured link that is known to be relatively strong between these two components. In addition, the use of a cardan joint 52 allows for the transmission of relatively large forces while giving a relatively large freedom of movement to the rod rotating component 26, which allows using the device 10 with containers 18 having various configurations without requiring, in some embodiments of the invention, major changes to the device 10.

Referring respectively to FIGS. 2B and 2A, there is shown that the device 10 includes a first and a second gearbox 54 and 56. Each of the first and second gearboxes 54 and 56 includes two gears mounted in a suitable casing. More specifically, the first gearbox 54 includes a first gearbox first gear 58 and a first gearbox second gear 60. The first gearbox first and second gears 58 and 60 engage each other and are substantially perpendicular to each other. The first gearbox 54 is described in further details hereinbelow.

Similarly, the second gearbox 56 extends between the component second end section 50 and the rod 22. The second gearbox 56 includes a second gearbox first gear 62 attached to the component second end section 50 and a second gearbox second gear 64 attached to the rod 22. The second gearbox first and second gear 62 and 64 engage each other and are substantially perpendicular to each other.

This configuration of the attachment between the rod rotating component 26 and the rod 22 provides a relatively compact link between these two components that nevertheless has relatively low power losses so as to allow operation of the device 10 manually if desired.

In some embodiments of the invention, the second gearbox first gear 62 is attached to the second member 32 through a cardan joint 53. Also, a stabilizing component extends from the second gearbox 56. The stabilizing component includes a spacing member 65 extending from the second gearbox 56 in a substantially parallel relationship relatively to the rod rotating component 26 and a collar 67 extending from the spacing member 65 so as to encircle the second member 32. This configuration stabilizes the cardan joint 53 and allows to relatively stably manipulate the rod rotating component 26.

In some embodiments of the invention, the rod actuating component 26 is pivotable in a predetermined plane, as illustrated by the arrow 66 in FIG. 1. For example, the predetermined plane 66 is substantially perpendicular to the rod longitudinal axis 24 and the actuator 20 is located in the predetermined plane 66. This configuration of the device 10 allows for a relatively compact device 10 that is therefore positionable between the container 18 and a vehicle that tows the container 18. Positioning the device 10 at a location located frontwardly relatively to the container 18 protects the device 10 against impacts that could occur if the device 10 were located at the rear of the container 18. Furthermore, this location of the device 10 allows intended users of the device 10 to operate the container 18 in a conventional manner such as, for example, by backing up the container 18 until it abuts against a loading dock, among other examples. Yet, furthermore, this location of the device 10 allows an intended user to be relatively close to a vehicle that tows the container 18 and, therefore, reduces the number of steps required from the intended user of the device 10 when manipulating the tarpaulin as he gets in or out of the vehicle. However, in alternative embodiments of the invention, the device 10 is located at any other suitable location.

Figure 5:
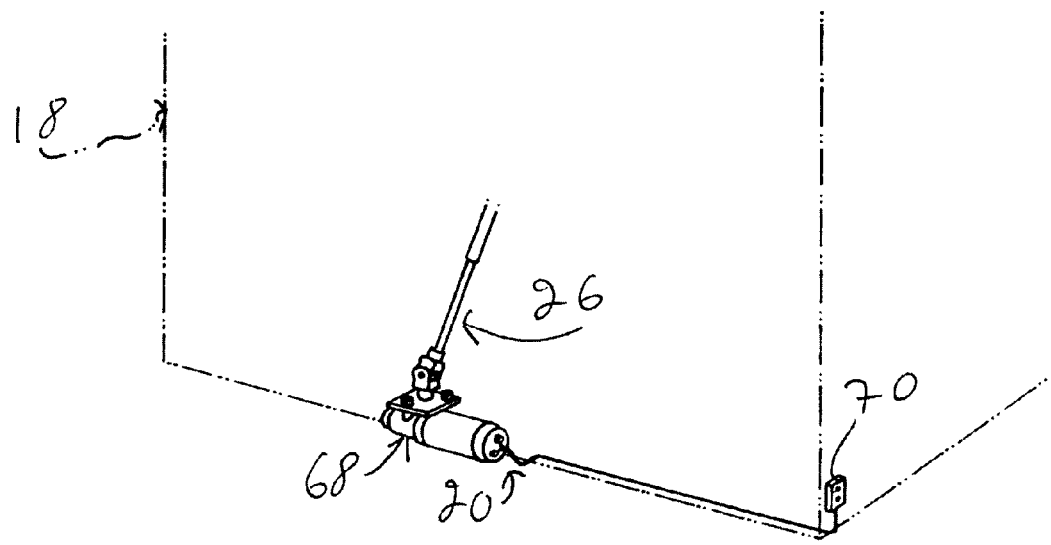
FIG. 5, in a perspective view, illustrates an alternative actuator usable to actuate the device shown in FIG. 1.
Figure 6:
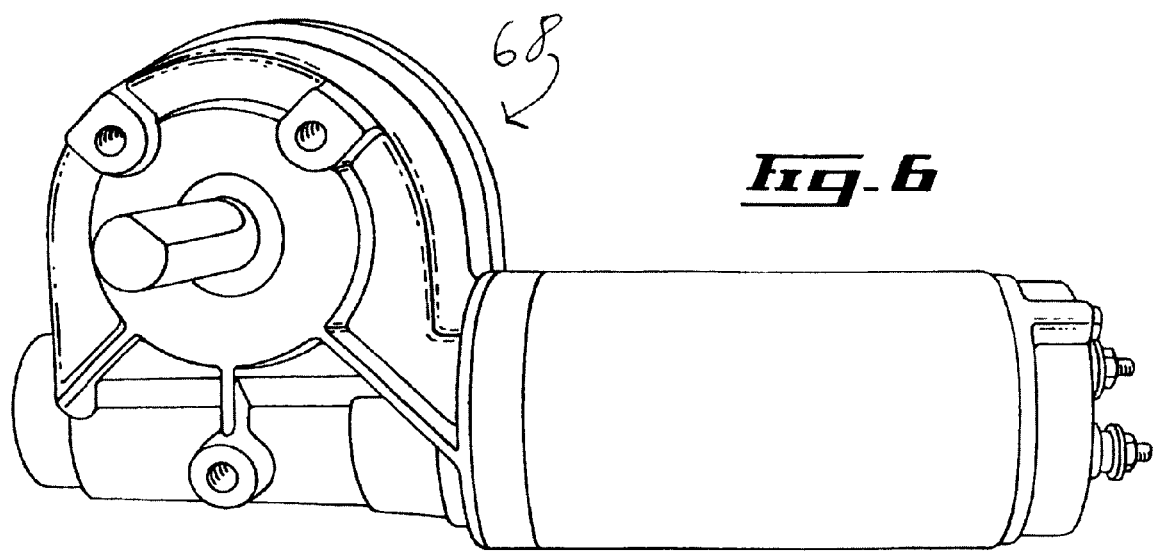
FIG. 6, in a perspective view, illustrates a motor of the actuator of FIG. 5.

As shown in FIGS. 5 and 6, in some embodiments of the invention, the actuator 20' includes a motor 68 linked to the rod rotating component 26 for rotating the rotating component 26 about the component longitudinal axis 28 and a controller 70 operatively coupled to the motor 28 for selectively energizing the motor 68 to rotate the rod rotating component 26. However, in alternative embodiments of the invention, the actuator 20 is a manually-actuated actuator 20, as further described hereinbelow.

To that effect, as better seen in FIG. 4, the actuator 20 includes a handle 72. The handle 72 is operatively coupled to the rod rotating component 26 for allowing rotation of the rod rotating component 26 about the component longitudinal axis 28 (both not shown in FIG. 4) upon the handle 72 being rotated. An advantage of having a manually-actuated device is that there is no need to link the container 18 and the device 10 to a power source to operate the device 10.

The actuator 20 includes an axle 74 defining an axle longitudinal axis 76. The axle 74 is mechanically coupled to the rod rotating component 26 for rotating the rod rotating component 26 about the component longitudinal axis 28 upon the axle 74 being rotated about the axle longitudinal axis 76. The actuator 20 further includes a handle mounting component 78, the handle mounting component being substantially elongated and defining a mounting component first end 80 and a substantially longitudinally opposed mounting component second end 82. The mounting component 78 is attached to the axle 74 substantially adjacent the mounting component first end 80 and the handle 72 is attached to the mounting component 78 substantially eccentrically relatively to the axle longitudinal axis 76. The axle 74 extends through a support flange 84 attached to the container 18, the support flange 84 defining a flange aperture 86 through which the axle 74 is rotatably mounted.

The axle 74 is operatively coupled to the rod rotating component 26 in any suitable manner. For example, the axle 74 is coupled to the rod rotating component 26 through the use of the first gearbox 54 extending between the axle 74 and the rod rotating component 26. In some embodiments of the invention, as seen in FIG. 2B, the first gearbox 54 includes a first gearbox first gear 58 coupled to the rod rotating component 26 and a first gearbox second gear 60 attached to the axle 74. The first gearbox first and second gears 58 and 60 engage each other and are substantially perpendicular to each other. This configuration, once again, provides a relatively compact device 10 with all the afore-mentioned advantages mentioned with respect to the use of the second gearbox 56.

In some embodiments of the invention, as seen in FIG. 3, the actuator 20 includes a unidirectional lock 90 for selectively allowing a rotation of the handle 72 in a single direction. For more clarity, the unidirectional lock 90 allows the handle 72 to rotate in a single direction that may be selected. In other words, the term "unidirectional" used to describe the unidirectional lock 90 refers to the ability to select a single direction into which the handle 72 is rotatable. However, in alternative embodiments of the invention, the unidirectional lock 90 locks the rotation of the rotatable handle 72 only in one direction, while allowing rotation in both directions if the unidirectional lock 90 is not engaged.

In a specific embodiment of the invention, the unidirectional lock 90 engages toothed gear 88 mounted to the axle 74 for joint rotation therewith about the axle longitudinal axis 76. The unidirectional lock 90 includes a pawl 92 mounted substantially adjacent to the toothed gear 88. The pawl 92 is movable between a first and second position, one of which is shown in solid lines and one of which is shown in phantom lines in FIG. 3. When the pawl 92 is in the first and second positions, the unidirectional lock 90 is respectively in a first and a second configuration. The pawl 92 engages the toothed gear 88 in a manner such that the pawl 92 allows a rotation of the toothed gear 88 in only one respective direction in each of the first and second positions.

This may be achieved, for example, by having a pawl 92 that includes a pawl first section 94, a pawl second section 96 opposed to the pawl first section 94 and a pawl central section 98 extending therebetween. The pawl 92 is mounted to the support flange 84 through a pawl mounting aperture into which a fastener 100 is inserted and secured to the support flange 84. In the first position, the pawl first section 94 engages the toothed gear 88. In the second position, the pawl second section 96 engages the toothed gear 88.

The use of the unidirectional lock 90 allows for relatively easily blocking the tarpaulin 12 in either of the extended or the retracted configurations. Also, the unidirectional lock 90 forces the actuator 20 to either only retract of extend the tarpaulin 12, with no possibility of the tarpaulin 12 moving in an unwanted direction.

In some embodiments of the invention, the tarpaulin 12 is biased towards the opened configuration by a device similar to the device shown in U.S. patent application Ser. No. 11/603,021 filed on Nov. 22, 2006 by the inventor named in the present patent application, which is hereby incorporated by reference in its entirety. However, in alternative embodiments of the invention, the tarpaulin 12 is either not biased or is biased in any other suitable manner using an alternative device.

The various components of the device 10 are coupled to each other in any suitable manner. A coupling of two components that rotate about the same rotation axis that has been found to be well suited to the present invention is the use of a rod end section of a rod of a first component received in a bore defined by a sleeve of a second component. Coupling apertures extending in register with each other in a direction substantially perpendicular to the bore and the rod end section all receive a coupling pin, such as for example a cotter pin. The coupling pin extends through the first and second components so as to prevent longitudinal and rotational movements of the rod end section relatively to the sleeve.

In use, the intended user of the device 10 positions the pawl 92 in either of the first and second positions. Then, the pawl 92 allows rotation of the handle 72 in only one direction, which is the direction in which the handle 72 rotates the toothed gear 88 in a direction in which the toothed gear 88 lifts the pawl 92. In turn, this rotates the axle 74 about the axle longitudinal axis 76, which in turn rotates the rod rotating component 26 about the component longitudinal axis 28. This rotation of the rod rotating component 26 in turn rotates the rod 22 about the rod longitudinal axis 24 to extend or retract the tarpaulin 12.

Although the present invention has been described hereinabove by way of preferred embodiments thereof, it can be modified, without departing from the spirit and nature of the subject invention as defined in the appended claims.

What is claimed is:

1. A device for manipulating a tarpaulin so as to selectively cover and uncover a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture, said device being usable in combination with an actuator providing a rotational motion, said actuator being spaced apart from said top aperture, said device comprising:

a rod for rolling the tarpaulin therearound when configuring the tarpaulin from the extended configuration to the retracted configuration and for unrolling the tarpaulin therefrom when configuring the tarpaulin from the retracted configuration to the extended configuration, said rod defining a rod longitudinal axis;

a rod rotating component having a substantially elongated configuration, said rod rotating component defining a component longitudinal axis, said rod rotating component being linkable to said actuator so as to be rotatable therewith about said component longitudinal axis, said rod rotating component being operatively coupled to said rod in a manner such that rotating said rod rotating component about said component longitudinal axis rotates said rod about said rod longitudinal axis;

wherein said rod rotating component is pivotable relatively to said actuator so as to be movable between a component open position and a component closed position, wherein in said component open position, said tarpaulin is in said tarpaulin open configuration and in said component closed position, said tarpaulin is in said tarpaulin closed configuration; and configurable between a component shortest configuration and a component longest configuration, said rod rotating component being longer in said component longest configuration than in said component shortest configuration;

whereby upon said actuator providing said rotational motion, said rod rotating component is rotated about said component longitudinal axis, which in turn rotates said rod about said rod longitudinal axis and pivots said rod rotating component between said component open and closed positions, variations in a length of said rod rotating component allowing said rod to remain linked to said actuator while remaining substantially adjacent to said top aperture as said rod is moved across said top aperture.

2. A device as defined in claim 1, wherein said rod rotating component includes a first member, said first member being substantially elongated and extending along said componeriL longitudinal axis, said first member being mechanically coupled to said actuator so as to be rotatable therewith; and a second member, said second member being substantially elongated and extending substantially longitudinally from said first member, said second member being operatively coupled to said rod in a manner such that rotating said second member about said component longitudinal axis rotates said rod about said rod longitudinal axis;

wherein said first and second members are operatively coupled to each other so as to be substantially jointly rotatable about said component longitudinal axis and so as to be substantially longitudinally movable relatively to each other to allow configuring said rod rotating component between said component shortest and longest configurations.

3. A device as defined in claim 2, wherein said second member defines a sleeve extending substantially longitudinally substantially adjacent to said first member, said sleeve defining a bore extending substantially longitudinally;

said first member defines a sleeve receiving section slidably mounted within said bore;

said sleeve and said sleeve receiving section are configured and sized so as to allow a longitudinal sliding movement, of said sleeve and said sleeve receiving section relatively to each other and a joint rotation of said sleeve and sleeve receiving section about said component longitudinal axis.

4. A device as defined in claim 3, wherein said bore defines a substantially longitudinal qroove and said sleeve receiving section defines a tongue configured and sized so as to be substantially longitudinally slidably received within said substantially longitudinal groove.

5. A device as defined in claim 1, wherein said rod rotating component defines a component first end section and a substantially longitudinally opposed component second end section, said component first end section being pivotally secured to said actuator.

6. A device as defined in claim 5, further comprising a cardan joint, said cardan joint being attachable to said actuator and attached to said component first end section to allow said rod rotating component to pivot relatively to said actuator while transmitting the rotational motion provided by said actuator to said rod rotating component.

7. A device as defined in claim 5, further comprising a gearbox extending between said component second end section and said rod, said gearbox including a first gear attached to said component second end section and a second gear attached to said rod, said tirst and second gears engaging each other and being substantially perpendicular to each other.

8. A device as defined in claim 1, wherein said rod rotating component is pivotable in a predetermined plane, said predetermined plane being substantially perpendicular to said rod longitudinal axis, said actuator being located in said predetermined plane.

9. A device for manipulating a tarpaulin so as to selectively cover and uncover a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture, said device comprising:

an actuator for providing a rotational motion, said actuator being spaced apart from said top aperture;

a rod for rolling the tarpaulin therearound when configuring the tarpaulin from the extended configuration to the retracted configuration and for unrolling the tarpaulin therefrom when configuring the tarpaulin from the retracted configuration to the extended configuration, said rod defining a rod longitudinal axis; and a rod rotating component having a substantially elongated configuration, said rod rotating component defining a component longitudinal axis, said rod rotating component being mechanically coupled to said actuator so as to be rotatable about said component longitudinal axis thereby, said rod rotating component being operatively coupled to said rod in a manner such that rotating said rod rotating component about said component longitudinal axis rotates said rod about said rod longitudinal axis;

wherein said rod rotating component is pivotable relatively to said actuator so as to he movable between a component open position and a component closed position, wherein in said component open position, said tarpaulin is in said tarpaulin open configuration and in said component closed position, said tarpaulin is in said tarpaulin closed configuration; and configurable between a component shortest configuration and a component longest configuration, said rod rotating component being longer in said component longest configuration than in said component shortest configuration;

whereby upon said actuator providing said rotational motion, said rod rotating component is rotated about said component longitudinal axis, which in turn rotates said rod about said rod longitudinal axis and pivots said rod rotating component between said component open and closed positions, variations in a length of said rod rotating component allowing said rod to remain linked to said actuator while remaining subsLantially adjacent to said top aperture as said rod is moved across said top aperture.

10. A device as defined in claim 9, wherein said actuator includes a motor linked to said rod rotating component for rotating said rod rotating component about said component longitudinal axis and a controller operatively coupled to said motor for selectively energizing said motor to rotate said rod rotating component.

11. A device as defined in claim 9, wherein said actuator includes a handle mechanically coupled to an axle so as to be rotable jointly therewith, said handle being operatively coupled to said rod rotating component for allowing said rod rotating component to rotate about said component longitudinal axis upon said handle being rotated.

12. A device as defined in claim 11, wherein said actuator includes a unidirectional lock for selectively allowing a rotation of said axle in a single direction.

13. A device as defined in claim 12, wherein said unidirectional lock is operable in a lock first configuration and in a lock second configuration, said unidirectional lock allowing a rotation of said axle in a single respective direction in each of said lock first and second configurations.

14. A device as defined claim 12, wherein
said actuator includes an axle defining an axle longitudinal axis, said axle being mechanically coupled to said rod rotating component for rotating said rod rotating component about said component longitudinal axis upon said axle being rotated about said axle longitudinal axis;
said actuator also includes a handle mounting component, said handle mounting component being substantially elongated and defining a mountinq component first end and a substantially longitudinally opposed mounting component second end, said mounting component being attached to said axle in a substantially perpendicular relationship relatively thereto; and
said handle is attached to said mounting component substantially eccentrically relatively to said axle longitudinal axis.

15. A device as defined in claim 14, wherein said actuator further includes a toothed gear mounted to said axle for joint rotation therewith about said axle longitudinal axis and said unidirectional lock includes a pawl mounted substantially adjacent to said toothed gear, said pawl being movable between a first and a second position, wherein in each of said first and second positions, said pawl engages said toothed gear in a manner such that said pawl allows a rotation of said toothed gear in only one respective direction.

16. A device as defined in claim 14 wherein said actuator includes a gearbox extending between said axle and said rod rotating component, said gearbox including a first gear mechanically coupled to said rod rotating component and a second gear attached to said axle, said first and second gears engaging each other and being substantially perpendicular to each other.

\* \* \* \* \*